United States Patent [19]
Lumma

[11] Patent Number: 5,136,165
[45] Date of Patent: Aug. 4, 1992

[54] METHOD AND DEVICE FOR COMPENSATING FOR DIFFERENCES IN SENSITIVITIES TO INCIDENT RADIATION OF A LUMINESCENT LAYER AND A TRANSDUCER

[75] Inventor: Waldemar Lumma, Hamburg, Fed. Rep. of Germany

[73] Assignee: U.S. Philips Corporation, New York, N.Y.

[21] Appl. No.: 644,720

[22] Filed: Jan. 23, 1991

[30] Foreign Application Priority Data

Jan. 27, 1990 [DE] Fed. Rep. of Germany ....... 4002432

[51] Int. Cl.$^5$ .............................................. G01T 1/16
[52] U.S. Cl. .................. 250/361 R; 250/369; 250/484.1; 250/252.1; 250/370.11
[58] Field of Search ............. 250/361 R, 369, 484.1 R, 250/252.1 R, 370.11

[56] References Cited

U.S. PATENT DOCUMENTS

| | | | |
|---|---|---|---|
| 3,458,700 | 7/1969 | Tadao | 250/71 |
| 4,220,860 | 9/1980 | Carlson et al. | 250/361 R |
| 4,634,934 | 1/1987 | Tohda et al. | 250/484.1 |
| 4,764,678 | 8/1988 | Yamakawa | 250/361 R |
| 4,818,877 | 4/1989 | Ayrai et al. | 250/361 R |
| 4,862,004 | 8/1989 | Koike et al. | 250/369 |

Primary Examiner—Carolyn E. Fields
Assistant Examiner—James Beyer
Attorney, Agent, or Firm—William Squire

[57] ABSTRACT

A luminescent layer is exposed to X-rays or gamma rays and whose luminescence is converted into an electric signal by a photo-electric transducer. Sensitivity variations of the combination formed by the luminescent layer and the transducer are compensated for in that the luminescent layer is repeatedly exposed to an electric field, during which exposure the sensitivity of the luminescent layer and the transducer is measured and stored, a calibration factor of the measuring device is created and changed each time in dependence on the stored sensitivity.

12 Claims, 1 Drawing Sheet

METHOD AND DEVICE FOR COMPENSATING FOR DIFFERENCES IN SENSITIVITIES TO INCIDENT RADIATION OF A LUMINESCENT LAYER AND A TRANSDUCER

FIELD OF THE INVENTION

The invention relates to a method for the measurement of X-rays or gamma rays by means of a measuring device which comprises a luminescent layer which is exposed to the X-rays or gamma rays and whose luminescence is converted into an electric signal by a photoelectric transducer, and also relates to a measuring device for carrying out the method.

BACKGROUND OF THE INVENTION

Such a method and measuring device are known from DE-OS 32 42 663. Therein, the sensitivity, i.e. the amplitude of the signal generated by the transducer in relation to the intensity of the radiation incident on the luminescent layer, is liable to change due to aging or ambient influences.

SUMMARY OF THE INVENTION

It is an object of the present invention to provide a method and a measuring device which enable compensation for such effects. This object is achieved in accordance with the invention in that the luminescent layer contains an electroluminescent material, the luminescent layer being repeatedly exposed to an electric field during which exposures the sensitivity of the luminescent layer and the transducer is measured and stored, a calibration factor of the measuring device being changed in dependence on the stored sensitivity.

The invention utilizes an electro-luminescent material, i.e. a luminescent material which is excited to emit luminescent light not only by X-rays or gamma rays, but also by an electric field, usually an alternating field. The invention is based on the recognition of the fact that the same centers of luminescence in the luminescent material produce the luminescent light upon activation by X-rays or gamma rays as well as upon activation by an electric field. As a result, the X-ray intensity required for producing a defined luminescent intensity varies in the same way as the electric field required for this luminescent intensity. Such a variation of the luminescent properties of the luminescent layer inherently has an effect on the sensitivity (amplitude of the output signal of the transducer in relation to the excitation intensity of the luminescent layer) of the combination formed by the luminescent material and the transducer. When the sensitivity (upon activation by an electric field) is measured and stored from time to time, sensitivity variations occurring upon detection of X-rays or gamma rays can be compensated for by variation of the calibration factor of the measuring device in dependence on the stored sensitivity.

A first device for performing the method in accordance with the invention is characterized in that the luminescent layer is provided between two electrodes which can be connected to a voltage source, there being provided means for deriving a calibration factor from the voltage across the electrodes and the transducer signal, there also being provided means for modifying the transducer signal, generated during exposure of the luminescent layer to the X-rays or gamma rays, in dependence on the calibration factor. The measurement value of the radiation intensity is then derived from the transducer signal.

Another device for performing the method in accordance with the invention, however, is characterized in that the luminescent layer is provided between two electrodes which can be connected to a controllable voltage source, the voltage source forming part of a control circuit, in that during measurement of the X-rays or the gamma rays the voltage across the electrodes assumes such a value that the transducer signal corresponds to a reference value, and in that the measurement value of the X-rays is derived from the voltage across the electrodes. The output signal of the transducer is thus maintained substantially constant by the control circuit. The measurement value of the X-rays is derived from the amplitude of the voltage across the electrodes; the measurement value is smaller as this amplitude is higher.

IN THE DRAWING

The invention will be described in detail hereinafter with reference to the drawing. Therein:

DESCRIPTION OF THE PREFERRED EMBODIMENT

Figure 1:
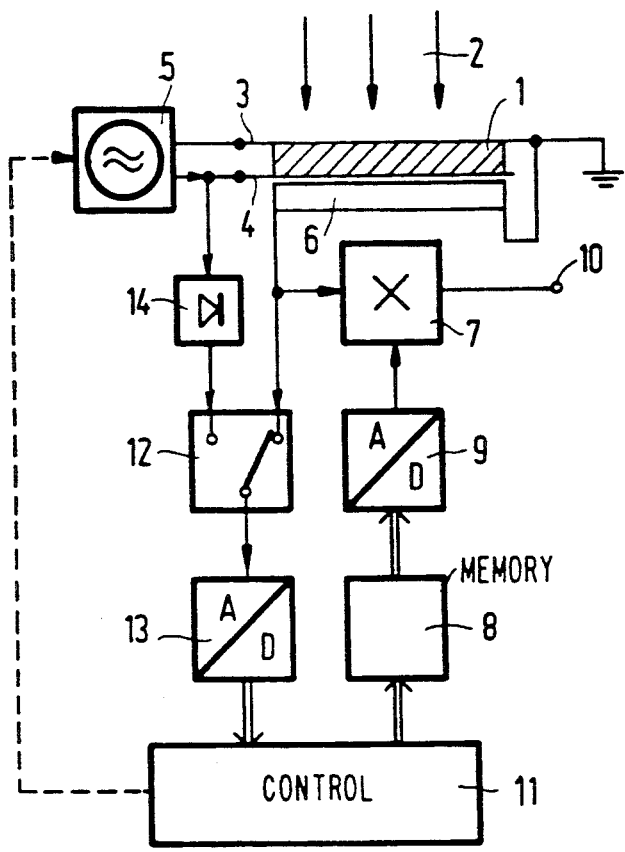
FIG. 1 shows the block diagram of a first measuring device.

The reference numeral 1 in FIG. 1 denotes a luminescent layer, for example an activated zinc sulfide, having radio-luminescent as well as electroluminescent properties. The luminescent layer which may consist of, for example, activated zinc sulfide and can be excited to emit luminescent light by X-rays as well as by an electric alternating field. The luminescent layer, having a thickness which suffices for the absorption of X-ray quanta from the X-ray beam 2, for example, a few hundreds of $\mu$m, is arranged between two parallel, flat electrodes 3 and 4 which extend perpendicularly to the plane of drawing. The electrode 3 which faces the X-ray beam is shaped so that it is substantially transparent to the X-rays but reflective for the luminescent radiation. The electrode 4, however, is also transparent to the luminescent light.

The two electrodes 3 and 4 are connected to an alternating voltage generator 5 which is capable of generating an alternating voltage having a frequency of a few hundreds of Hz and an amplitude which suffices to excite the luminescence in the luminescent layer. In conjunction with the alternating voltage generator, the assembly formed by the electrodes 3 and 4 and the luminescent layer arranged therebetween acts as an electroluminescent foil such as used in displays for background illumination or as a luminescent capacitor.

The luminescent light which is produced in the luminescent layer upon incidence of X-rays and which emanates through the electrode 4 is converted into an electric signal by a transducer 6 which is optically coupled thereto, which electric signal is amplified to a suitable level by means of an amplifier (not shown). The transducer 6 may consist of one or more photodiodes which completely or partly cover the light-emissive surface. The output signal of the transducer 6 is applied to one input of a multiplier stage 7. In the multiplier stage 7 the output signal of transducer 6 is multiplied by a signal which is stored as a digital value in a memory 8 and which is applied to a second input of the multiplier circuit, via a digital-to-analog converter 9. The signal on the output 10 of the multiplier stage is a measure of the intensity of the X-rays in the X-ray beam 2 and thus represents the measurement value of the X-rays.

As has already been stated, the sensitivity of the luminescent capacitor formed by layer 1 and electrodes 3, 4 and/or the transducer 6 is liable to change due to environmental influences or aging processes. In order to ensure that the measurement value on the output 10 also changes in such cases there is provided an arithmetic and control unit 11 which may comprise, for example a suitably programmed microprocessor which adapts the value stored in the memory 8, referred to hereinafter as the calibration factor, to the relevant sensitivity variations.

Therefore, from time to time (if necessary also for each measurement) the sensitivity of the combination formed by the luminescent material 1 and the transducer 6 is measured for electric excitation (in the activated condition of the alternating voltage generator 5 and in the absence of X-rays or gamma rays), a calibration factor being determined therefrom. To this end, the arithmetic and control unit 11 receives, via a multiplexer 12 and an analog-to-digital converter 13, a first signal which corresponds to the (amplified) output signal of the transducer 6, and also a second signal which corresponds to the amplitude of the voltage between the electrodes 3 and 4. The second signal is supplied by a rectifier unit 14 which generates a direct voltage which is proportional to the amplitude of the alternating voltage but which is substantially smaller than the alternating voltage, so that the first and the second signal are of the same order of magnitude.

The arithmetic and control unit 11 forms the quotient of the second and the first signal and stores this quotient, or a value dependent thereon, as a calibration factor in the memory 8. The calibration factor is greater as the sensitivity (quotient of the first and the second signal) is reduced. Consequently, during subsequent measurements of the X-rays or gamma rays, during which the control unit 11 de-activates the alternating voltage generator 5, the signal of the transducer 6, multiplied by the calibration factor and appearing on the output 10, is independent of variations of the sensitivity of the combination formed by the luminescent layer 1 and the transducer 6.

Figure 2:
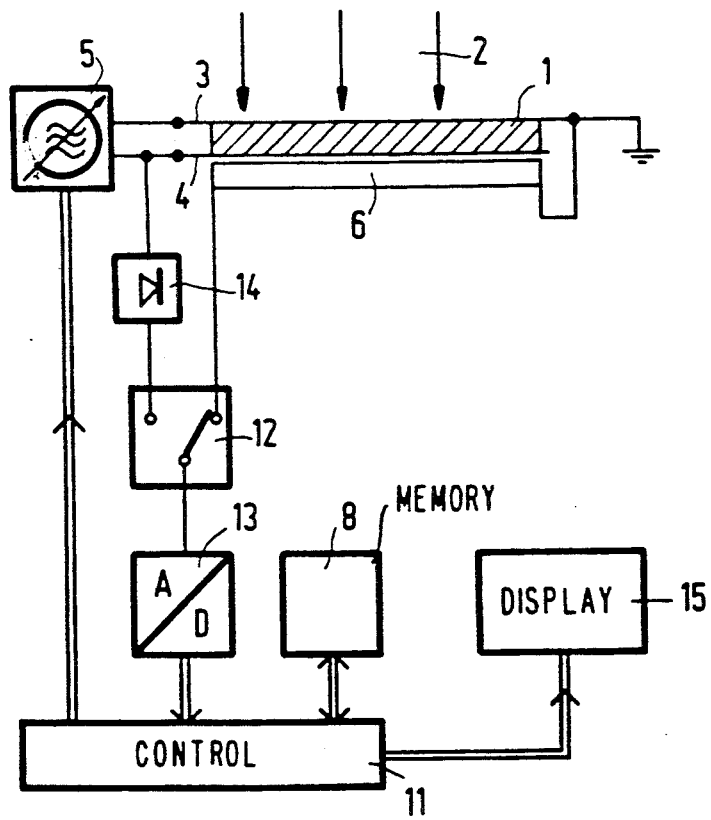
FIG. 2 shows the block diagram of a second measuring device.

Parts of the measuring device shown in FIG. 2 which have the same function as in the device shown in FIG. 1 are denoted by corresponding reference numerals. However, the amplitude of the alternating voltage supplied by the alternating voltage generator 5 can be controlled by the control unit 11. During the measurement of the intensity of an X-ray beam 2, the multiplexer initially occupies the position denoted in FIG. 2. The signal of the transducer 6 is amplified and converted into a digital data word, after which it is compared with a reference value in the control unit 11. In the case of deviations the control unit 11 controls the amplitude of the alternating voltage generator 5, so that the transducer signal remains constant.

Because the transducer signal is thus substantially independent of the intensity of the X-rays, the measurement value for this intensity cannot be derived therefrom. However, the amplitude of the alternating voltage supplied by the alternating voltage generator 5 is a measure of this intensity. This is because the higher the alternating voltage need be in order to make the transducer signal reach the reference value, the lower the intensity of the X-ray beam will be, and vice versa. Therefore, after the reference value has been reached, the multiplexer is switched to the position which is not shown in FIG. 2; from the digital value of the alternating voltage then obtained the measurement value is derived so as to be applied, for example, to a display unit 15.

When the sensitivity changes, for example becomes smaller, a higher intensity of the X-rays or a higher amplitude of the alternating voltage will be required so as to reach the reference value. In order to render the measurement value independent of such a sensitivity variation, in the absence of X-rays the amplitude of the alternating voltage is measured which is required to ensure that the transducer signal corresponds to the reference value. The reciprocal value of this amplitude, to be stored, for example in the memory 8, is a measure of the sensitivity of the combination formed by the luminescent layer 1 and the transducer 6. During the subsequent intensity measurements the amplitude of the alternating voltage is multiplied by this calibration factor.

However, it is alternatively possible to adapt the reference value of the transducer 6 to the sensitivity variations. To this end, in the absence of the X-rays the amplitude of the alternating voltage is adjusted to a predetermined, constant value and the signal of the transducer is measured and digitised. This digital value is stored in the memory 8 and represents the reference value for the subsequent intensity measurements. The constant value of the alternating voltage must be chosen so that the intensity of the luminescent light is higher than or equal to the intensity of the luminescent light when the X-rays are maximum.

The measuring device described with reference to the FIGS. 1 and 2 can be used, for example in an automatic X-ray exposure device which terminates the X-ray exposure when a predetermined dose is reached. In that case the time integral over the measurement value must be formed. Such a measuring device is also capable of measuring the dose power during X-ray exposure or X-ray fluoroscopy. It is also possible to measure absolute radiation doses or radiation dose powers. To this end, the measuring device must be calibrated once by means of a calibration radiation source whose radiation intensity (at the area of the luminescent layer 1) is exactly known, and the measurement value thus obtained must be stored. The intensity of a radiation source measured at a later instant is higher or lower than that of the calibration source as the measurement value is higher or lower than the measurement value obtained during the calibration measurement.

What is claimed is:

1. A measuring device for the measurement one of X-rays and gamma rays comprising:
    a luminescent layer comprising means for receiving said rays to produce luminescent radiation representing the magnitude of the intensity of said rays incident on the layer during a given exposure;
    means for applying the luminescent radiation to a transducer to convert the incident luminescent radiation into a corresponding electrical signal, said layer and transducer tending to exhibit different sensitivities to said rays at different times causing said signal to have different values for a given value of said rays; and circuit means for determining a calibration factor from said signal to compensate for said different sensitivities.

2. The device of claim 1 wherein said means for determining includes means for measuring and storing said sensitivities and for forming said calibration factor based on said stored sensitivities.

3. The device of claim 1 wherein said layer is activated zinc sulfide.

4. A measuring device for measuring one of X-rays and gamma rays comprising:
a luminescent layer between a pair of electrodes for generating luminescence radiation in response to an applied voltage and to said rays incident thereon;
means for applying said voltage to said electrodes;
a transducer adjacent to said layer and responsive to the luminescence of said layer for generating a signal whose value manifests the magnitude of said luminescence radiation incident thereon;
means for deriving a calibration factor from said applied voltage and the generated signal corresponding to said applied voltage; and
means for modifying the value of the signal generated by said transducer in response to said incident rays in dependence on the value of said calibration factor.

5. The device of claim 4 wherein said means for deriving includes digitizing means for digitizing said applied voltage and said generated signal, control means responsive to said digitized voltage and signal for deriving said calibration factor, said means for modifying including means for multiplying said derived factor with said signal value generated in response to said incident luminescent radiation.

6. The device of claim 4 wherein said means for modifying includes means for modifying the value of the voltage applied to said electrodes to maintain the value of said generated signal constant.

7. A device for the measurement of one of X-ray or Gamma ray intensity comprising:
a pair of electrodes;
a luminescent layer between the electrodes responsive to said rays and to a voltage applied across the electrodes for generating luminescent radiation;
a transducer responsive to said luminescent radiation for generating an output signal manifesting the value of radiation incident thereon; and
control means including a voltage source for applying a voltage across said electrodes having a value such that the output signal of said transducer corresponds to a reference value regardless the value of said intensity and for deriving the measurement value of said intensity from the voltage across said electrodes.

8. A method for measuring one of X-ray or gamma ray intensity comprising:
generating luminescent radiation in response to said rays and to a voltage applied to a luminescent layer;
generating an output signal manifesting the value of said generated luminescent radiation;
applying a voltage to said layer, said voltage having a value such that said output signal in response to say rays applied to said layer corresponds to a reference value regardless the value of said intensity; and
deriving the measurement value of said intensity from the voltage applied to said layer.

9. A method for the measurement of one of X-rays and gamma rays comprising:
exposing a luminescent layer to said rays to produce luminescent radiation representing the magnitude of the intensity of said rays incident on the layer during a given exposure;
applying the luminescent radiation to a transducer to convert the incident luminescent radiation into a corresponding electrical signal, said layer and transducer tending to exhibit different sensitivities to said rays at different times causing said signal to have different values for a given value of said rays; and
determining a calibration factor from said signal to compensate for said different sensitivities, said determining including repeatedly exposing the layer to an electric field and measuring and storing the sensitivity of the layer and transducer during said repeated exposing, said determining further including changing the calibration factor in dependence on the stored sensitivity.

10. A method for the measurement of one of X-rays and gamma rays comprising:
exposing a luminescent layer to said rays to produce luminescent radiation representing the magnitude of the intensity of said rays incident on the layer during a given exposure;
applying the luminescent radiation to a transducer to convert the incident luminescent radiation into a corresponding electrical signal, said layer and transducer tending to exhibit different sensitivities to said rays at different times causing said signal to have different values for a given value of said rays; and
determining a calibration factor from said signal to compensate for said different sensitivities, said determining including measuring and storing said sensitivities and forming said calibration factor based on said stored sensitivities, said measuring and storing including measuring the value of a signal produced by a reference voltage applied to said layer, said forming including forming a ratio of said reference voltage to the signal value produced by said reference voltage.

11. The method of claim 10 including removing said reference voltage, applying said rays to be measured to said layer, and multiplying the output of said transducer by said calibration factor.

12. The method of claim 11 including changing the value of said reference voltage so that the value of said electrical signal is constant at said different times and measuring the amplitude of said changed reference voltage.

* * * * *